United States P

Osawa et al.

3,768,890

Oct. 30, 1973

[54] INTERNAL FOCUSING WIDE ANGLE EYEPIECE

[75] Inventors: Kiyoyasu Osawa, Tokyo; Mutsuhiko Matsuura, Yokohama, both of Japan

[73] Assignee: Nippon Kogaku K.K., Tokyo, Japan

[22] Filed: June 12, 1972

[21] Appl. No.: 262,102

[30] Foreign Application Priority Data
June 12, 1971 Japan.............................. 46/41410
June 12, 1971 Japan.............................. 46/41411

[52] U.S. Cl. .............................. 350/220, 350/175 E
[51] Int. Cl. .......................................... G02b 25/00
[58] Field of Search................. 350/175 E, 220, 184

[56] References Cited
UNITED STATES PATENTS

| | | |
|---|---|---|
| 3,390,935 | 7/1968 | Scidmore................. 350/175 E UX |
| 2,859,654 | 11/1958 | Back.................................. 350/184 |
| 3,202,050 | 8/1965 | Seidenberg............... 350/175 E UX |
| 3,410,629 | 11/1968 | Carpenter et al.............. 350/184 X |
| 3,638,996 | 2/1972 | Klein........................... 350/175 E X |

*Primary Examiner*—John K. Corbin
*Attorney*—Joseph M. Fitzpatrick et al.

[57] ABSTRACT

A wide angle eyepiece for an internal focusing optical system of a viewing instrument comprises six elements. As viewed axially from rear to front, the eyepiece includes a biconvex doublet eyelens having a negative meniscus element and a biconvex element cemented together, a first positive meniscus single lens concaved toward the eye, a second positive meniscus single lens convexed toward the eye, and a positive meniscus doublet field lens having a biconvex element and a biconcave element cemented together. The field lens and at least one of the single lenses are axially movable together for focusing.

3 Claims, 30 Drawing Figures

SPHERICAL ABERRATION ———
SINE CONDITION ----

FIG. 2B  ASTIGMATISM

FIG. 2C  DISTORTION

FIG. 2D  COMA

SPHERICAL ABERRATION ———
SINE CONDITION ----
ASTIGMATISM
DISTORTION

COMA  FIG. 4H

INTERNAL FOCUSING WIDE ANGLE EYEPIECE

BACKGROUND OF THE INVENTION

1. Field of the Invention

This invention relates to oculars, and more particularly, to an internal focusing wide angle eyepiece usable with any device which requires an eyepiece, such as a telescope, binocular, measuring instrument, microscope, camera, cinecamera or the like.

2. Description of the Prior Art

Heretofore, focusing by the use of an eyepiece or the adjustment of visibility to each individual's parallax has usually been accomplished by moving an entire eyepiece of a type already proposed. According to such practice, however, the viewer's eye must follow the axial movement of the eyepiece. In other words, the viewer must move the position of his eye as the eyepiece is moved. Also, where air-tight or water-proof conditions are required in a mechanism, it has been very difficult to obtain complete integrity against water or air due to the mechanical provisions for axial movement of the eyepiece.

SUMMARY OF THE INVENTION

We have conceived apparatus of the class described by which we are able to eliminate the above-noted disadvantages peculiar to the conventional eyepiece, and to provide an internal focusing wide angle eyepiece in which various aberrations are well corrected throughout a field of view as wide as 68° or more and which permits a relatively long distance from the first surface of a first lens element to the eye point (hereinafter referred to as "eye distance"), as viewed in the direction from the viewer's eye.

According to a broad feature of the present invention, there is provided a wide angle eyepiece for an internal focusing optical system of a viewing instrument which comprises, axially from rear to front, i.e., from the eye side to the object side, a biconvex doublet eyelens having a negative meniscus element and biconvex element cemented to each other, a first positive meniscus single lens concaved toward the eye, a second positive meniscus single lens convexed toward the eye, and a positive meniscus doublet field lens having a biconvex element and a biconcave element cemented to each other, the field lens and at least one of the single lenses being axially movable in unison for focusing According to another feature of the present invention there is provided a wide angle eyepiece of the described type wherein the eyelens and the first positive meniscus single lens together form a stationary lens group and wherein the second single lens and the field lens together form a focusing lens movable for adjustment of visibility between negative, zero and positive diopter or for focusing from the infinite to a close distance.

According to still another feature of the present invention, there is provided a wide angle eyepiece of the described type wherein the eyelens forms a stationary lens group and wherein the first and second single lenses and the field lens together form a focusing lens movable for adjustment of visibility between negative, zero and positive diopter or for focusing from the infinite to the closest distance.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utlized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein.

DESCRIPTION OF THE PREFERRED EMBODIMENTS

Figure 1A:
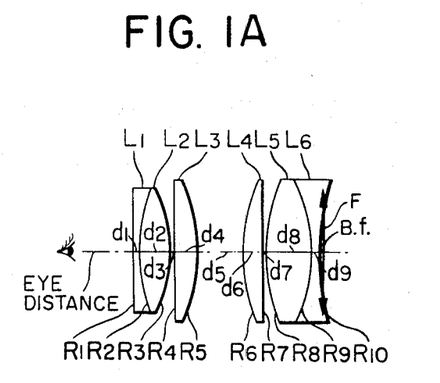
FIGS. 1(A)–1(C) schematically illustrate the arrangement of the wide angle eyepiece according to an embodiment of the present invention at stages of axial displacement of the focusing lens group corresponding to the negative, zero and positive diopter, respectively.
Figure 1B:
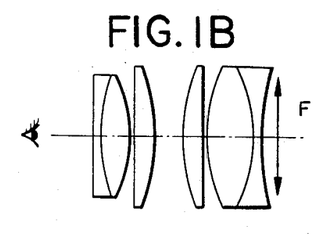

Referring to FIG. 1(A), the internal focusing wide angle eyepiece, according to an embodiment of the present invention, comprises six lens elements. As viewed from left to right, the eyepiece includes a first element L1 such as a negative meniscus lens convexed toward the eye or a plano-concave lens flattened toward the eye, a second element L2 such as a biconvex lens, a third element L3 such as a positive meniscus lens concaved toward the eye, a fourth element L4 such as a positive meniscus lens convexed toward the eye, a fifth element L5 such as a biconvex lens, and a sixth element L6 such as a biconcave lens. F is a focal plane of the entire eyepiece, and B.f is back focus. The first and second elements L1 and L2 and the fifth and sixth elements L5 and L6 are cemented together, respectively. When the diopter is zero, it is assumed that the total focal length of the entire eyepiece is $f$, the subtotal focal length of the first to third elements is $f_1$, the subtotal focal length of the fourth to sixth elements if $f_2$, the radii of curvature of the successive lens surfaces are R1, R2, etc., the center thicknesses or the interspatial distances of the successive elements are $d_1$, $d_2$, etc., the refractive indices of the respective elements for light having a wavelength of 5876A are $n_1$, $n_2$, etc., and the Abbe numbers of the successive elements are $\nu_1$, $\nu_2$, etc. Then the arrangement shown satisfies the following conditions:

1. With the lens group of the first to third elements stationary and with the focusing lens group of the fourth to sixth elements axially movable together within the range $0 \leq d_5 \leq 1.1f$, adjustment of the visibility can be made between negative, zero and positive diopter and focusing can be effected between infinity and the closest distance.

2. The sixth element L6 is a biconcave lens with a refractive index $n_6 \geq n_5$.

3. $f_1 \geq 0.7f$.

4. $\nu_1 \leq 35, \nu_6 \leq 35$.

Regarding condition (1) above, it is natural with an angle eyepiece of the internal focusing type that the outer lens group thereof, i.e., the first to third elements adjacent the eye should be stationary while the inner lens group should be movable. According to the present embodiment, the inner lens group, comprising the fourth to sixth elements which are movable together, provides a focusing lens.

Figure 1C:
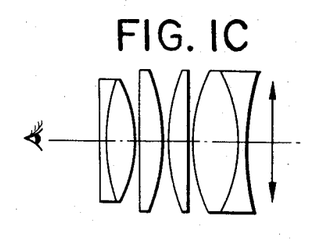
Figure 2A:
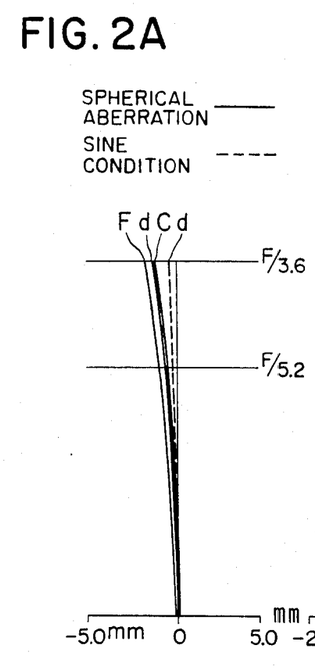
FIGS. 2(A)–2(L) illustrate various aberrations in the arrangement of FIGS. 1(A)–1(C) corresponding to the negative, zero and positive diopter, respectively.
Figure 2B:
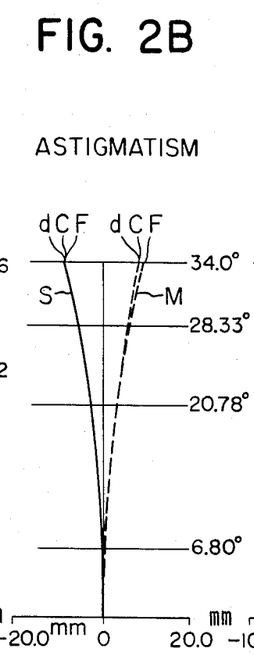
Figure 2C:
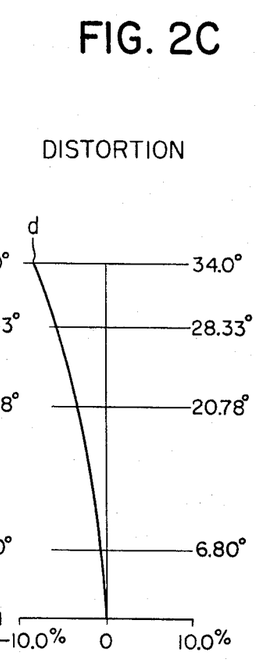
Figure 2D:
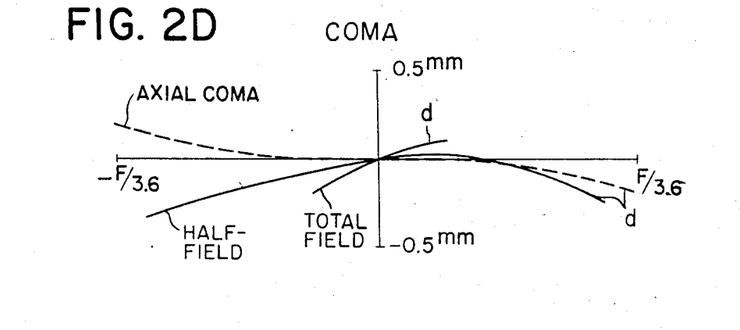
Figure 2E:
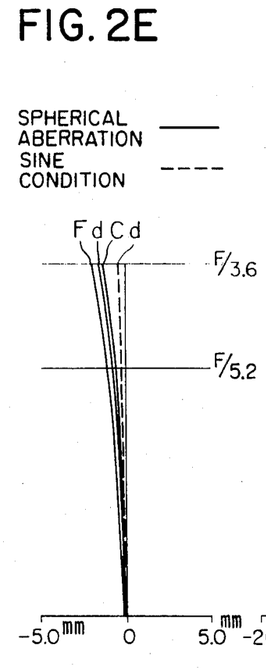
Figure 2F:
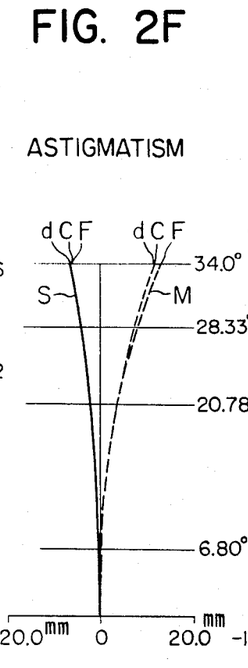
Figure 2G:
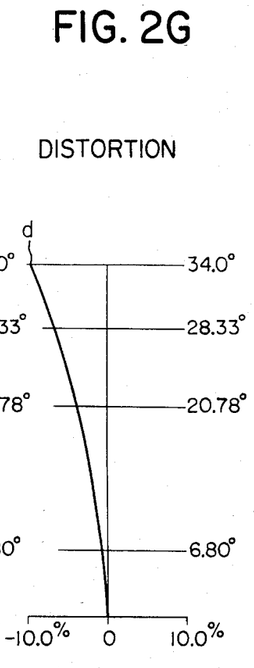
Figure 2H:
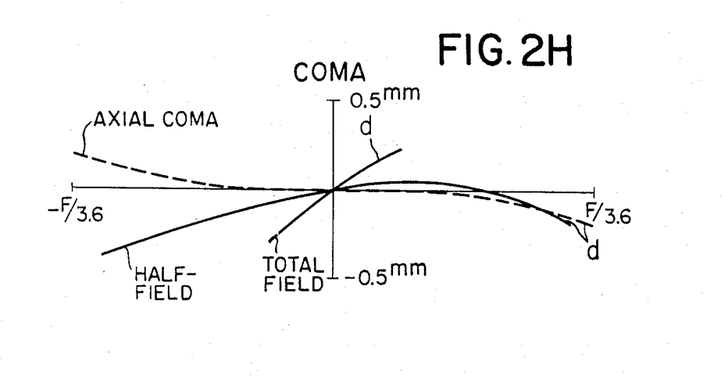
Figure 2I:
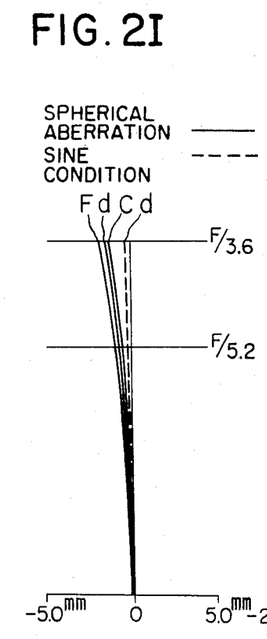
Figures 2J, 2K:
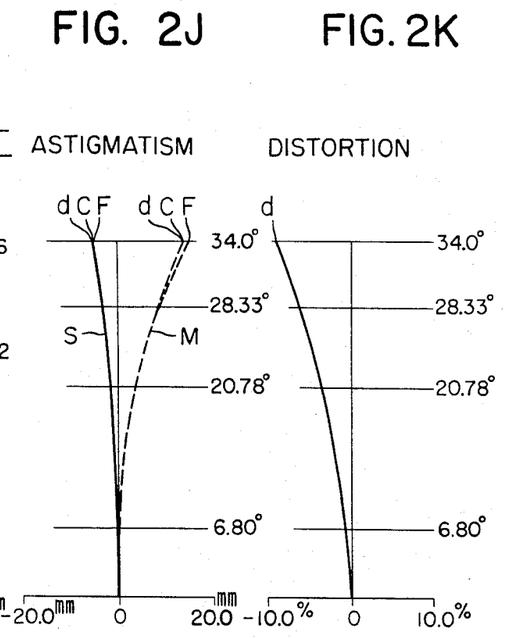
Figure 2L:
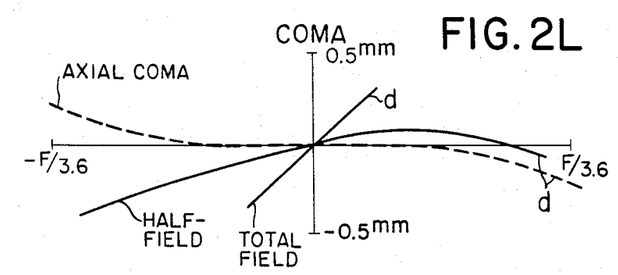

The upper limit $d_5 = 1.1f$ of the condition that $0 \leq d_5 \leq 1.1f$ is the limit of negative diopter (FIG. 1A), and the lower limit $d_5 = 0$, i.e., the limit at which the fourth element L4 of the focusing lens group contacts the third element L3, is the limit of positive visibility (FIG. 1C). Between these two limits, the focusing lens may be freely moved and together with conditions (2) to (4), this maintains good characteristics of various aberrations such as spherical aberration, coma, astigmatism, distortion, curvature of image field, and chromatic aberration. Any departure from the upper limit would seriously aggravate these various aberrations and also greatly reduce the eye distance.

Condition (2) above is useful in that the lens surface R10 of the sixth element L6 is concaved toward a not-shown objective lens (i.e., convexed toward the eye) to thereby under-correct the coma with respect to the light rays incident on the marginal area of the view field of the lens surface R10 so as to negate the over-correction in the lens surfaces R3, R8, etc.; and further that the lens surface R9 of the sixth element L6 is concaved toward the eye, and together with the relation $n_6 \geq n_5$, reduces the distortion in the focusing lens as well as providing a good correction of the lateral chromatic aberration. In addition to these advantages, condition (2) serves to locate the rear principal point of the entire system nearer to the eye to increase the eye distance. If the sixth element L6 in the present embodiment is a plano-concave lens or a negative meniscus lens or extremely, if the fifth and sixth elements L5 and L6 are disposed in inverted order with the sixth element L6 comprising a biconvex lens, then the above-described advantages of the present invention would be lost, thus failing to provide a wide angle eyepiece having such a long eye distance as could be provided by the present invention.

Condition (3) above is intended to provide a balance between the refractive power of the focusing lens group and that of the stationary lens group. Any value of the subtotal focal length $f_1$ less than the value $0.7f$ would mean a relative increase in the subtotal focal length $f_2$ of the focusing lens group, and accordingly an excess in the adjustment of the visibility, i.e., the amount of displacement of this lens group per diopter, thus requiring a very great value for the distance $d_5$ between the stationary lens group and the focusing lens group. Also, in such a case, the refractive power of the focusing lens group would be reduced to give rise to the necessity for a greater diameter of the stationary lens group which, in turn, would result in a reduced eye distance and un-satisfactory correction of various aberrations, particularly coma and distortion, in the entire system.

Condition (4) above is directed to the correction of the chromatic aberration in the entire eyepiece. If the first element L1 is formed of a glass material whose dispersive power for light is lower than the limit prescribed by this condition, the various aberrations, particularly lateral chromatic aberration, in the focusing lens group would be under-corrected to fail in providing a good correction of the chromatic aberration in general.

An example of the internal focusing wide angle eyepiece which satisfies all the foregoing conditions will be shown below.

Example 1

Relative Aperture F/3.6; Angle of View $2\alpha = 68°$

R1 = 5724.138
$d_1 = 6.897$   $n_1 = 1.80518$   $\nu_1 = 25.5$
R2 = 218.138
$d_2 = 37.931$  $n_2 = 1.65160$   $\nu_2 = 58.5$
R3 = −126.986
$d_3 = 1.379$
R4 = +11046.9
$d_4 = 24.138$  $n_3 = 1.62041$   $\nu_3 = 60.3$
R5 = −232.759   (A)    (B)    (C)
$d_5 = 55.172 - 31.034 - 6.897$
R6 = 266.414
$d_6 = 20.690$  $n_4 = 1.62041$   $\nu_4 = 60.3$
R7 = 5551.724
$d_7 = 1.379$
R8 = 186.207
$d_8 = 58.621$  $n_5 = 1.62041$   $\nu_5 = 60.3$
R9 = −152.331
$d_9 = 6.897$   $n_6 = 1.80518$   $\nu_6 = 25.5$
R10 = 334.004

|  | (A) | (B) | (C) |
|---|---|---|---|
| Total focal length f | = 104.8mm − | 100.0mm − | 95.6mm |
| Back focus B.f. | = 4.3mm − | 16.9mm − | 28.5mm |
| Angle of view | $2\alpha = 68°$ | | |

It should be understood that visibility is zero diopter when $d_5$ is of the value shown at (B).

Tables (A), (B) and (C) below show Seidel coefficients for negative, zero and positive diopter, respectively.

(A)

| Lens Surfaces | I | II | III | IV | V |
|---|---|---|---|---|---|
| R1 | 0.0000 | −0.0000 | 0.0078 | 0.0078 | −0.0001 |
| R2 | −0.0165 | 0.0165 | −0.0731 | −0.0401 | 0.0154 |
| R3 | 0.7782 | −0.7782 | 2.6452 | 1.0889 | −0.9916 |
| R4 | −0.0648 | 0.0648 | −0.1980 | −0.0683 | 0.1997 |
| R5 | 0.6167 | −0.6167 | 2.0146 | 0.7812 | −1.0375 |
| R6 | −0.0537 | 0.0537 | −0.0175 | 0.0900 | 0.2888 |
| R7 | 0.1526 | −0.1526 | 0.4509 | 0.1457 | −0.5761 |
| R8 | −0.0709 | 0.0709 | −0.0071 | 0.1347 | 0.3993 |
| R9 | −0.0065 | 0.0065 | −0.0608 | −0.0479 | 0.0821 |
| R10 | 0.0237 | −0.0237 | −0.0625 | −0.1099 | −0.6488 |
| Σ | 1.3588 | −1.3588 | 4.6995 | 1.9821 | −2.2688 |

Total focal length $f = 1.048$
Stop is disposed 0.671 ahead of the lens surface R1

(B)

| Lens Surfaces | I | II | III | IV | V |
|---|---|---|---|---|---|
| R1 | 0.0000 | −0.0000 | 0.0078 | 0.0078 | −0.0001 |
| R2 | −0.0165 | 0.0165 | −0.0731 | −0.0401 | 0.0154 |
| R3 | 0.7782 | −0.7782 | 2.6452 | 1.0889 | −0.9916 |
| R4 | −0.0648 | 0.0648 | −0.1980 | −0.0683 | 0.1997 |
| R5 | 0.6167 | −0.6167 | 2.0146 | 0.7812 | −1.0375 |
| R6 | −0.0516 | 0.0516 | −0.0110 | 0.0922 | 0.2607 |
| R7 | 0.2383 | −0.2383 | 0.7081 | 0.2314 | −0.7003 |
| R8 | −0.0827 | 0.0827 | −0.0425 | 0.1229 | 0.4033 |
| R9 | −0.0300 | 0.0300 | −0.1316 | −0.0715 | 0.1305 |
| R10 | 0.1038 | −0.1038 | 0.1778 | −0.0298 | −0.7714 |
| Σ | 1.4914 | −1.4914 | −5.0973 | 2.1147 | −2.4913 |

Total focal length $f = 1.0$
Stop is positioned 0.690 ahead of the lens surface R1.

(C)

| Lens Surfaces | I | II | III | IV | V |
|---|---|---|---|---|---|
| R1  | 0.0000  | −0.0000 | 0.0078  | 0.0078  | −0.0001 |
| R2  | −0.0165 | 0.0165  | −0.0731 | −0.0401 | 0.0154  |
| R3  | 0.7782  | −0.7782 | 2.6452  | 1.0889  | −0.9916 |
| R4  | −0.0648 | 0.0648  | −0.1980 | −0.0683 | 0.1997  |
| R5  | 0.6167  | −0.6167 | 2.0146  | 0.7812  | −1.0375 |
| R6  | −0.0446 | 0.0446  | 0.0098  | 0.0091  | 0.2267  |
| R7  | 0.3427  | −0.3427 | 1.0211  | 0.3358  | −0.8448 |
| R8  | −0.0875 | 0.0875  | −0.0568 | 0.1181  | 0.3965  |
| R9  | −0.0775 | 0.0775  | −0.2741 | −0.1190 | 0.2058  |
| R10 | 0.1916  | −0.1916 | 0.4414  | 0.0581  | −0.9023 |
| Σ   | 1.6383  | −1.6383 | 5.5379  | 2.2616  | −2.7322 |

Total focal length $f = 0.956$
Stop is positioned 0.707 ahead of the lens surface R1.

As the result of the realization of such an internal focusing wide angle eyepiece, it is possible to provide a device whose bodytube is invariable in its apparent length irrespective of any adjustment effected on the visibility or on the focal point by means of the eyepiece, and this leads to the feasibility of increasing the strength and rigidity of the eyepiece portion of the device which has heretofore been fragile. Moreover, the construction of the present invention in which only the inner lens group is movable, instead of the entire eyepiece as in the prior art, permits the whole bodytube to be much more readily maintained airtight and waterproof by fixing the outer stationary lens group completely immovably and intimately to a bodytube supporting frame. Furthermore, even if the focusing group is moved to vary the visibility or the focal point, the various aberrations very well corrected over a wide angle of view exceeding 68° may be substantially invariable, thus providing an internal focusing wide angle eyepiece comprising six elements and permitting a very long eye distance.

Such an internal focusing eyepiece may also be used as an excellent eyepiece of the convention type, not of the internal focusing type, by fixing the stationary lens group and the focusing lens group with a certain spacing therebetween maintained in the range of $0 \leq d_5 \leq 1$. If, i.e., by maintaining the distance $d_5$ constant, so as to permit movement of the entire eyepiece system.

Figure 3A:
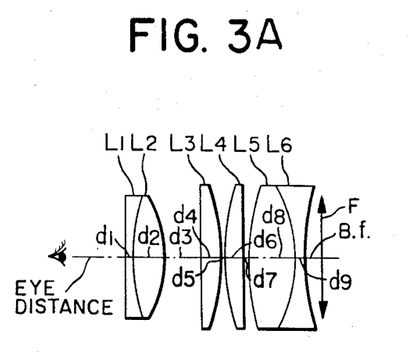
FIGS. 3(A)–(C) schematically illustrate the arrangement of wide angle eyepiece according to another embodiment of the present invention at stages of axial displacement of the focusing lens group corresponding to the negative, zero and positive diopter, respectively.
Figure 3B:
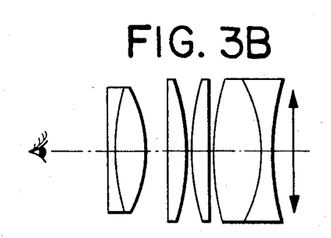

Referring now to FIG. 3(A), there is shown another embodiment of the internal focusing wide angle eyepiece according to the present invention, which again comprises six lens elements. As viewed from left to right in the figure, the eyepiece includes a first element L1 such as a negative meniscus lens convexed toward the eye or a plano-convex lens flattened toward the eye, a second element L2 such as a biconvex lens, a third element L3 such as a positive meniscus lens concaved toward the eye, a fourth element L4 such as a positive meniscus lens convexed toward the eye, a fifth element L5 such as a biconvex lens, and a sixth element L6 such as a biconcave lens. F is a focal plane of the entire eyepiece and B.F. is back focus. the first and second elements L1 and L2 and the fifth and sixth elements L5 and L6 are cemented together, respectively. When the visibility is zero diopter, it is assumed that the total focal length of the entire eyepiece is $f$, the subtotal focal length of the first and second elements L1 and L2 is $f_1$, the subtotal focal length of the third to sixth elements is $f_2$, the radii of curvature of the successive lens surfaces are R1, R2, etc., the center thicknesses or the interspatial distances of the successive elements are $d_1$, $d_2$, etc., the refractive indices of the respective elements for the light having a wavelength of 5876A are $n_1, n_2$, etc., and the Abbe numbers of the successive elements are $v_1, v_2$, etc. Then the shown arrangement satisfies the following conditions:

1. With the lens group of the first and second elements L1 and L2 stationary and with the focusing lens group of the third to sixth elements axially movable together within the range of $0 \leq d_3 \leq 0.9f$, adjustment of the visibility can be made between negative, zero and positive degrees and focusing can be effected between the infinite and the closest distance.
2. The sixth element L6 is a biconcave lens with a refractive index $n_6 \geq n_5$.
3. $f_1 \geq f$.
4. $v_1 \leq 35$, $v_6 \leq 35$.

As regards the condition (1) above, it is natural with a wide angle eyepiece of the internal focusing type that the outer lens group thereof, i.e., the first and second elements adjacent the eye should be stationary while the inner lens group should be movable. According to the present embodiment, the inner lens group, comprising the third to sixth elements which are movable together, provides a focusing lens.

Figure 3C:
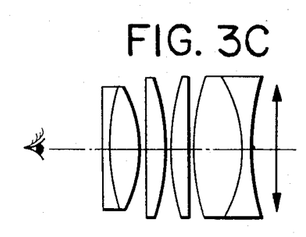
Figure 4A:
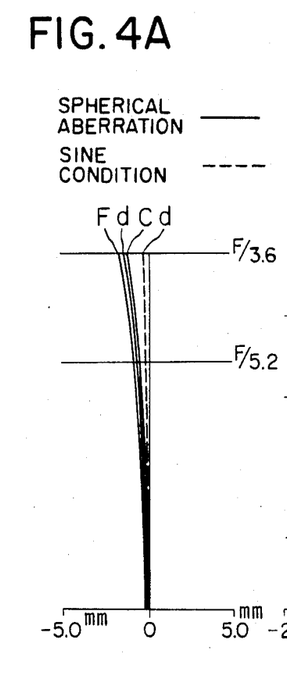
FIGS. 4(A)–4(L) illustrates various aberrations in the arrangement of FIGS. 3(A)–3(C) corresponding to the negative, zero and positive diopter, respectively.
Figure 4B:
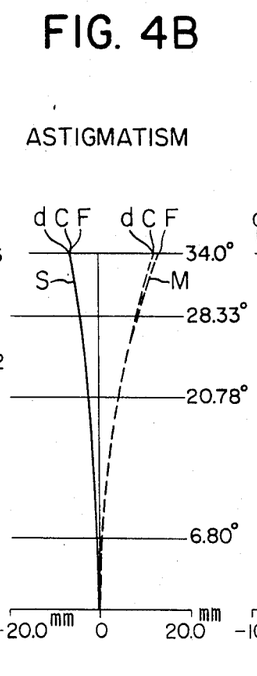
Figure 4C:
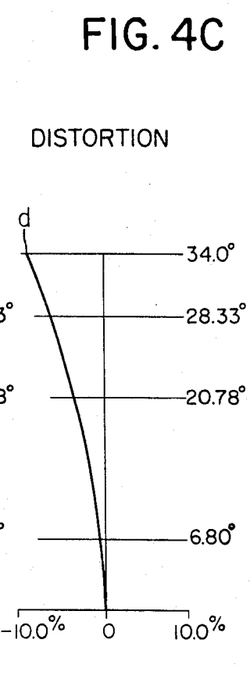
Figure 4D:
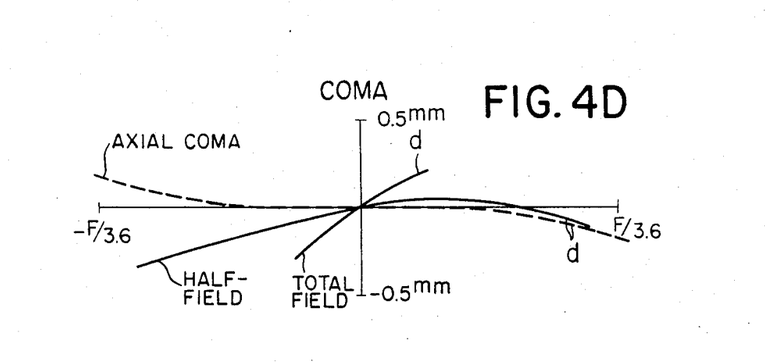
Figure 4E:
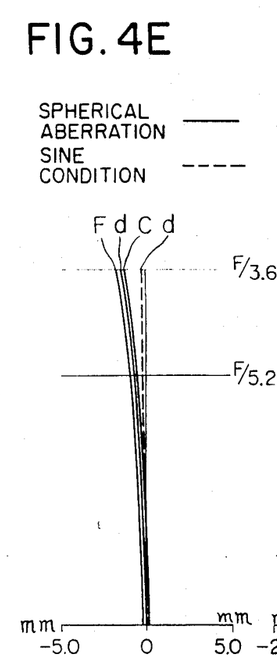
Figures 4F, 4G:
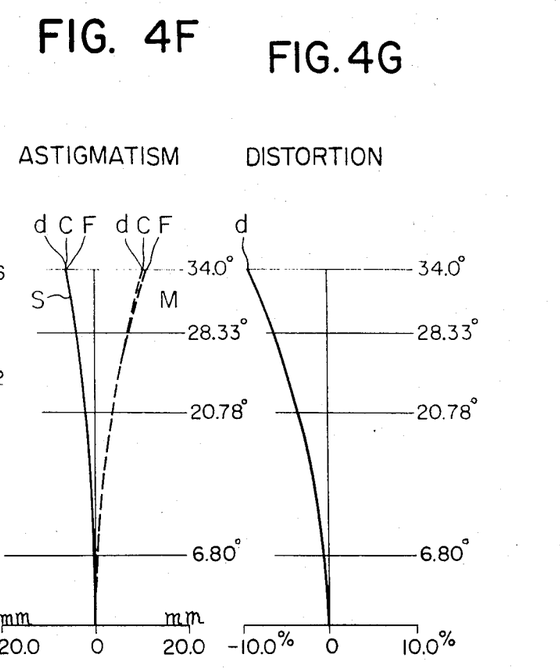
Figure 4H:
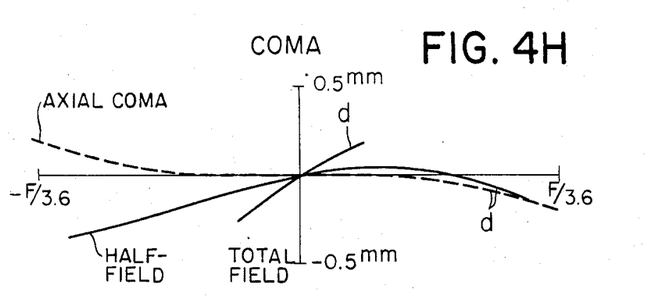
Figures 4I, 4J:
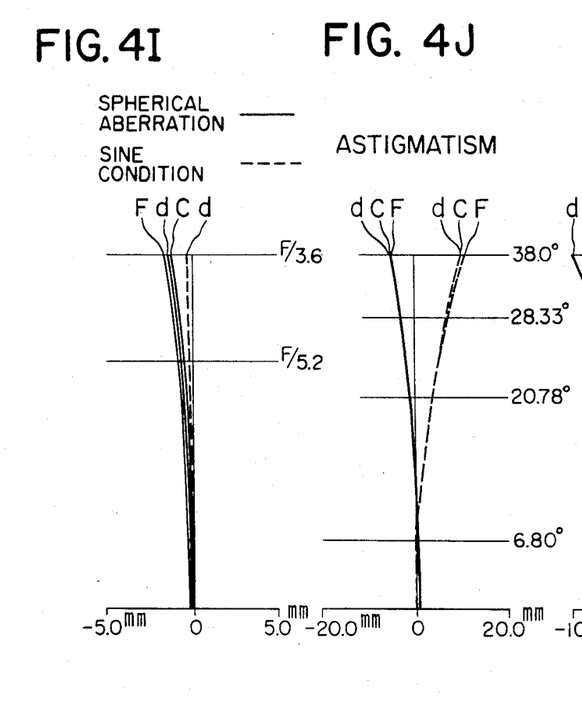
Figure 4K:
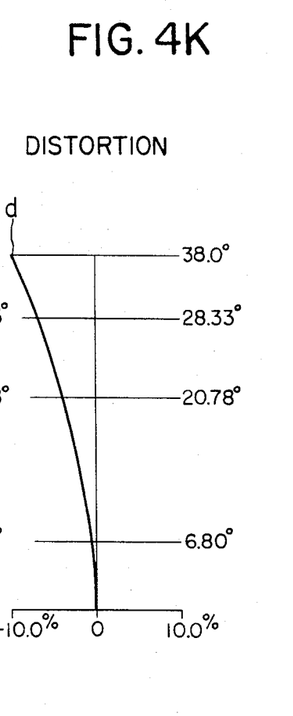
Figure 4L:
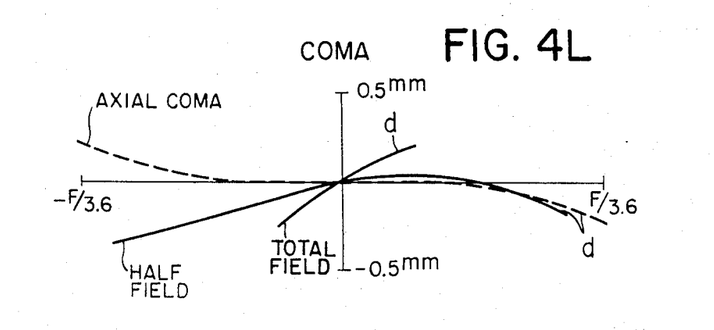

The upper limit $d_3 = 0.9f$ of the condition that $0 \leq d_3 \leq 0.9f$ is the limit of the negative visibility (FIG. 3A), and the lower limit $d_3 = 0$, i.e., the limit at which the third element L3 of the focusing lens contacts the second element L2, is the limit of the positive visibility (FIG. 3C). Between these two limits, the focusing lens may be freely moved and together with the conditions (2) to (4), this maintains good conditions of various aberrations such as spherical aberration, coma, astigmatism, distortion, curvature of image field, and chromatic aberration. Any departure from the upper limit would seriously aggravate these various aberrations and also greatly reduce the eye distance.

Condition (2) above is useful in that the lens surface R10 of the sixth element L6 is concaved toward a not-shown objective lens (i.e., convexed toward the eye) to thereby under-correct the coma therein with respect to the light rays incident on the marginal area of the view field of the lens surface R10 so as to negate the over-correction in the lens surfaces R3, R8, etc., and further that the lens surface R9 of the sixth element L6 is concaved toward the eye and together with the relation $n_6 \geq n_5$, this reduces the distortion in the focusing lens as well as provides a good correction of the lateral chromatic aberration. In addition to these advantages, the condition (2) serves to make the rear principal point of the entire system nearer to the eye to increase the eye distance. If the sixth element L6 in the present embodiment is a plano-concave lens or a negative meniscus lens, or extremely, if the fifth and sixth elements L5 and L6 are disposed in inverted order with the sixth element L6 comprising a biconvex lens, then the above-described advantages of the present invention would be lost, thus failing to provide a wide angle eyepiece having such a long eye distance as could be provided by the present invention.

Condition (3) above is intended to provide a balance between the refractive power of the focusing lens group and that of the stationary lens group. Any value of the subtotal focal length $f_1$ of the first and second elements L1 and L2 less than the prescribed range would mean a relative increase in the subtotal focal length $f_2$ of the focusing lens group, and accordingly an excess in the adjustment of the visibility, i.e., the amount of displacement of this lens group per diopter, thus requiring a very great value for the distance $d_3$ between the stationary lens group and the focusing lens group. Also, in such a case, the refractive power of the focusing lens group would be reduced to give rise to the necessity for a greater diameter of the stationary lens group which, in turn, would result in a reduced eye distance and unsatisfactory correction of various aberrations, particularly coma, astigmatism and distortion, in the entire system.

Condition (4) above is directed to the correction of the chromatic aberration in the entire eyepiece. If the first element L1 is formed of a glass material whose dispersive power for light is lower than the limit prescribed by this condition, the various aberrations, particularly lateral chromatic aberration, in the focusing lens group would be under-corrected to fail in providing a good correction of the chromatic aberration in general.

An example of the internal focusing wide angle eyepiece which satisfies all the foregoing conditions will be shown below.

Example 2

Relative aperture F/3.6; Angle of view $2\alpha = 68°$

R1 = 6424.828
$d_1 = 6.897$   $n_1 = 1.80518$   $\nu_1 = 25.5$
R2 = 245.034
$d_2 = 37.931$   $n_2 = 1.65160$   $\nu_2 = 58.5$
R3 = −124.69
(A)   (B)   (C)
$d_3 = 41.379 - 24.138 - 6.897$
R4 = −11046.9
$d_4 = 24.138$   $n_3 = 1.62041$   $\nu_3 = 60.3$
R5 = −232.759
$d_5 = 1.379$
R6 = 266.414
$d_6 = 20.690$   $n_4 = 1.62041$   $\nu_4 = 60.3$
R7 = 5551.724
$d_7 = 1.379$
R8 = 186.207
$d_8 = 58.621$   $n_5 = 1.62041$   $\nu_5 = 60.3$
R9 = −152.331
$d_9 = 6.897$   $n_6 = 1.80518$   $\nu_6 = 25.5$
R10 = 287.323

|  | (A) | (B) | (C) |
|---|---|---|---|
| Total focal length f | = 104.7mm | − 100mm | − 95.7mm |
| Back focus B.f. | = 20.9mm | − 25.0mm | − 28.8mm |
| Angle of view $2\alpha = 68°$ | | | |

It should be understood that visibility is zero diopter when $d_3$ is of the value shown at (B).

Tables (A), (B) and (C) below show Seidel coefficients for negative, zero and positive diopter, respectively.

(A)

| Lens Surfaces | I | II | III | IV | V |
|---|---|---|---|---|---|
| R1 | 0.0000 | −0.0000 | 0.0069 | 0.0069 | −0.0000 |
| R2 | −0.0116 | 0.0116 | −0.0559 | −0.0327 | 0.0108 |
| R3 | 0.8343 | −0.8343 | 2.8193 | 1.1507 | −1.0621 |
| R4 | −0.0571 | 0.0571 | −0.1748 | −0.0606 | 0.2004 |
| R5 | 0.3580 | −0.3580 | 1.2384 | 0.5224 | −0.7235 |
| R6 | −0.0404 | 0.0404 | 0.0225 | 0.1033 | 0.2212 |
| R7 | 0.2187 | −0.2187 | 0.6491 | 0.2118 | −0.6463 |
| R8 | −0.0689 | 0.0689 | −0.0012 | 0.1367 | 0.3548 |
| R9 | −0.0341 | 0.0341 | −0.1439 | −0.0756 | 0.1323 |
| R10 | 0.1009 | −0.1009 | 0.1475 | −0.0543 | −0.6997 |
| Σ | 1.2998 | −1.2998 | 4.5079 | 1.9086 | −2.2121 |

Total focal length $f = 1.047$
Stop is positioned 0.616 ahead of the lens surface R1.

(B)

| Lens Surfaces | I | II | III | IV | V |
|---|---|---|---|---|---|
| R1 | 0.0000 | −0.0000 | 0.0069 | 0.0069 | −0.0000 |
| R2 | −0.0116 | 0.0116 | −0.0559 | −0.0327 | 0.0108 |
| R3 | 0.8343 | −0.8343 | 2.8193 | 1.1507 | −1.0621 |
| R4 | −0.0631 | 0.0631 | −0.1928 | −0.0666 | 0.2065 |
| R5 | 0.4645 | −0.4645 | 1.5579 | 0.6290 | −0.8596 |
| R6 | −0.0436 | 0.0436 | 0.0130 | 0.1001 | 0.2270 |
| R7 | 0.2818 | −0.2818 | 0.8384 | 0.2749 | −0.7507 |
| R8 | −0.0798 | 0.0798 | −0.0337 | 0.1258 | 0.3804 |
| R9 | −0.0539 | 0.0539 | −0.2032 | −0.0954 | 0.1678 |
| R10 | 0.1399 | −0.1399 | 0.2646 | −0.0153 | −0.7886 |
| Σ | 1.4685 | −1.4685 | 5.0145 | 2.0774 | −2.4685 |

Total focal length $f = 1.0$
Stop is positioned 0.669 ahead of the lens surface R1.

(C)

| Lens Surfaces | I | II | III | IV | V |
|---|---|---|---|---|---|
| R1 | 0.0000 | −0.0000 | 0.0069 | 0.0069 | −0.0000 |
| R2 | −0.0116 | 0.0116 | −0.0559 | −0.0327 | 0.0108 |
| R3 | 0.8343 | −0.8343 | 2.8193 | 1.1507 | −1.0621 |
| R4 | −0.0692 | 0.0692 | −0.2110 | −0.0727 | 0.2128 |
| R5 | 0.5921 | −0.5921 | 1.9407 | 0.7565 | −1.0177 |
| R6 | −0.0465 | 0.0465 | 0.0043 | 0.0972 | 0.2322 |
| R7 | 0.3565 | −0.3565 | 1.0627 | 0.3496 | −0.8688 |
| R8 | −0.0911 | 0.0911 | −0.0676 | 0.1145 | 0.4064 |
| R9 | −0.0806 | 0.0806 | −0.2833 | −0.1221 | 0.2114 |
| R10 | 0.1855 | −0.1855 | 0.4012 | 0.0303 | −0.8858 |
| Σ | 1.6694 | −1.6694 | 5.6173 | 2.2782 | −2.7608 |

Total focal length $f = 0.957$
Stop is positioned 0.717 ahead of the lens surface R1.

The internal focusing wide angle eyepiece as shown in Example 2 may also lead to the various advantages described previously with respect to Example 1. Further, such an internal focusing eyepiece may also be used as an excellent eyepiece of the conventional type, not of the internal focusing type, by fixing the stationary lens group and the focusing lens group with a certain spacing therebetween maintained in the range of $0 \leq d_3 \leq 0.9f$, i.e., by maintaining the distance $d_3$ constant, so as to permit movement of the entire eyepiece system.

We believe that the construction and application of our novel eyepiece will now be understood and that its advantages will be fully appreciated by those persons skilled in the art.

We claim:

1. A wide angle eyepiece for an internal focusing optical system of a viewing instrument comprising, axially from rear to front, a biconvex doublet eyelens having a negative meniscus element curved towards the eye and a biconvex element cemented to each other, a first positive meniscus single lens concaved toward the eye, a second positive meniscus single lens convexed toward the eye, and a positive meniscus doublet field lens having a biconvex element and a biconcave element cemented to each other, said field lens and at least one of said single lenses being axially movable in unison for focusing.

2. A wide angle eyepiece according to claim 1, wherein the following data is satisfied:

Relative aperture F/3.6; Angle of view $2\alpha = 68°$

R1 = 5724.138
$d_1 = 6.897$   $n_1 = 1.80518$   $\nu_1 = 25.5$
R2 = 218.138
$d_2 = 37.931$   $n_2 = 1.65160$   $\nu_2 = 58.5$
R3 = −126.986
$d_3 = 1.379$
R4 = −11046.9
$d_4 = 24.138$   $n_3 = 1.62041$   $\nu_3 = 60.3$
R5 = −232.759
(A)   (B)   (C)
R6 = 266.414   $d_5 = 55.172 - 31.034 - 6.897$
$d_6 = 20.690$   $n_4 = 1.62041$   $\nu_4 = 60.3$
R7 = 5551.724
$d_7 = 1.379$
R8 = 186.207
$d_8 = 58.621$   $n_5 = 1.62041$   $\nu_5 = 60.3$
R9 = −152.331
$d_9 = 6.897$   $n_6 = 1.80518$   $\nu_6 = 25.5$
R10 = 334.004

(A)   (B)   (C)

Total focal length $f$ = 104.8mm — 100.0mm — 95.6mm
Back focus B.f. = 4.3mm — 16.9mm — 28.5mm 3. A wide angle eyepiece according to claim 1, wherein the following data is satisfied:
Relative aperture F/3.6; Angle of view $2\alpha = 68°$ R1 = 6424.828
$\quad d_1 = 6.897 \quad n_1 = 1.80518 \quad \nu_1 = 25.5$
R2 = 245.034
$\quad d_2 = 37.931 \quad n_2 = 1.65160 \quad \nu_2 = 58.5$
$\quad\quad\quad (A) \quad\quad (B) \quad\quad (C)$
R3 = −124.69
$\quad d_3 = 41.379 - 24.138 - 6.897$
R4 = −11046.9
$d_4 = 24.138$
$\quad\quad\quad\quad\quad\quad n_3 = 1.62041 \quad \nu_3 = 60.3$
R5 = −232.759
R6 = 266.414
$\quad d_5 = 1.379$
$\quad d_6 = 20.690 \quad n_4 = 1.62041 \quad \nu_4 = 60.3$
R7 = 5551.724
$\quad d_7 = 1.379$
R 8 = 186.207
$\quad d_8 = 58.621 \quad n_5 = 1.62041 \quad \nu_5 = 60.3$
R9 = −152.331
$\quad d_9 = 6.897 \quad n_6 = 1.80518 \quad \nu_6 = 25.5$
R10 = 287.323

$\quad\quad\quad\quad\quad (A) \quad\quad (B) \quad\quad (C)$
Total focal length f = 104.7mm — 100mm — 95.7mm
Back focus B.f. = 20.9mm — 25.0mm — 28.8 mm

\* \* \* \* \*

UNITED STATES PATENT OFFICE
CERTIFICATE OF CORRECTION

Patent No. 3,768,890   Dated  October 30, 1973

Inventor(s) KIYOYASU OSAWA ET AL.

It is certified that error appears in the above-identified patent and that said Letters Patent are hereby corrected as shown below:

Column 2, line 28, before "wide", insert -- the --;

Column 4, line 66, at $\Sigma$, 3rd vertical column, change "-5.0973" to -- 5.0973 --.

Column 9, claim 3, cancel "$d_4$=24.138" from vertical column 1 and insert same in vertical column 2 two lines below "$d_3$=......6,897".

Signed and sealed this 4th day of June 1974.

(SEAL)
Attest:

EDWARD M. FLETCHER, JR.
Attesting Officer

C. MARSHALL DANN
Commissioner of Patents